(12) United States Patent
Graham et al.

(10) Patent No.: US 11,632,664 B2
(45) Date of Patent: Apr. 18, 2023

(54) SYSTEM AND METHOD FOR MOBILE AND DISTRIBUTED CLOUD-CENTRIC DETECTION OF UNMANNED SYSTEMS

(71) Applicant: Counter-Drone Research Corporation, Vienna, VA (US)

(72) Inventors: Justus Graham, Vienna, VA (US); Michael Piscopo, King of Prussia, PA (US); Timothy James O'Shea, Arlington, VA (US)

(73) Assignee: Counter-Drone Research Corporation, Arlington, VA (US)

( * ) Notice: Subject to any disclaimer, the term of this patent is extended or adjusted under 35 U.S.C. 154(b) by 765 days.

(21) Appl. No.: 16/407,106

(22) Filed: May 8, 2019

(65) Prior Publication Data

US 2019/0349739 A1 Nov. 14, 2019

Related U.S. Application Data

(60) Provisional application No. 62/669,621, filed on May 10, 2018.

(51) Int. Cl.
*H04W 8/00* (2009.01)
*G01S 19/51* (2010.01)
*G01S 5/02* (2010.01)
*H04L 67/10* (2022.01)

(52) U.S. Cl.
CPC .............. *H04W 8/005* (2013.01); *G01S 5/02* (2013.01); *G01S 5/0221* (2013.01); *G01S 5/0284* (2013.01); *G01S 19/51* (2013.01); *H04L 67/10* (2013.01)

(58) Field of Classification Search
CPC ........ H04W 8/005; G01S 5/02; G01S 5/0221; G01S 5/0284; G01S 19/51
USPC ............................... 342/357.34, 30; 340/552
See application file for complete search history.

(56) References Cited

U.S. PATENT DOCUMENTS

| | | | | |
|---|---|---|---|---|
| 5,966,090 A * | 10/1999 | McEwan | .............. | A61B 5/0507 340/552 |
| 2009/0184862 A1 * | 7/2009 | Stayton | ................ | G08G 5/0008 342/30 |
| 2016/0260323 A1 * | 9/2016 | Blekken | ............... | G08G 1/0133 |
| 2018/0356333 A1 * | 12/2018 | Shehri | .................... | G01N 22/02 |

* cited by examiner

*Primary Examiner* — Bo Fan
(74) *Attorney, Agent, or Firm* — Foley & Lardner LLP

(57) ABSTRACT

An unmanned aerial system (UAS) detection device includes a sensor having programmed instructions to cause the sensor to scan energy in an electromagnetic spectrum; process the energy in the electromagnetic spectrum into bursts; determine whether the bursts are valid UAS bursts based on burst criteria; and correlate the bursts into a single signal.

20 Claims, 7 Drawing Sheets

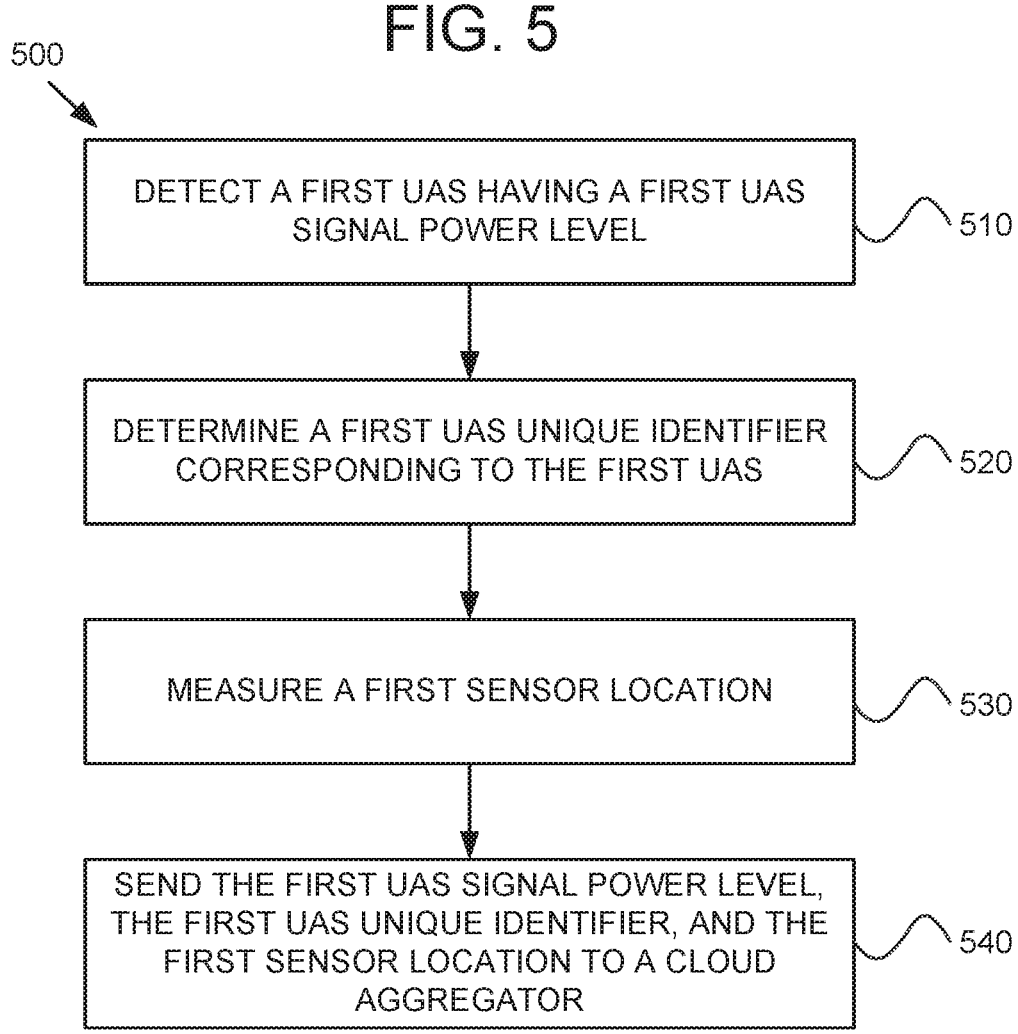

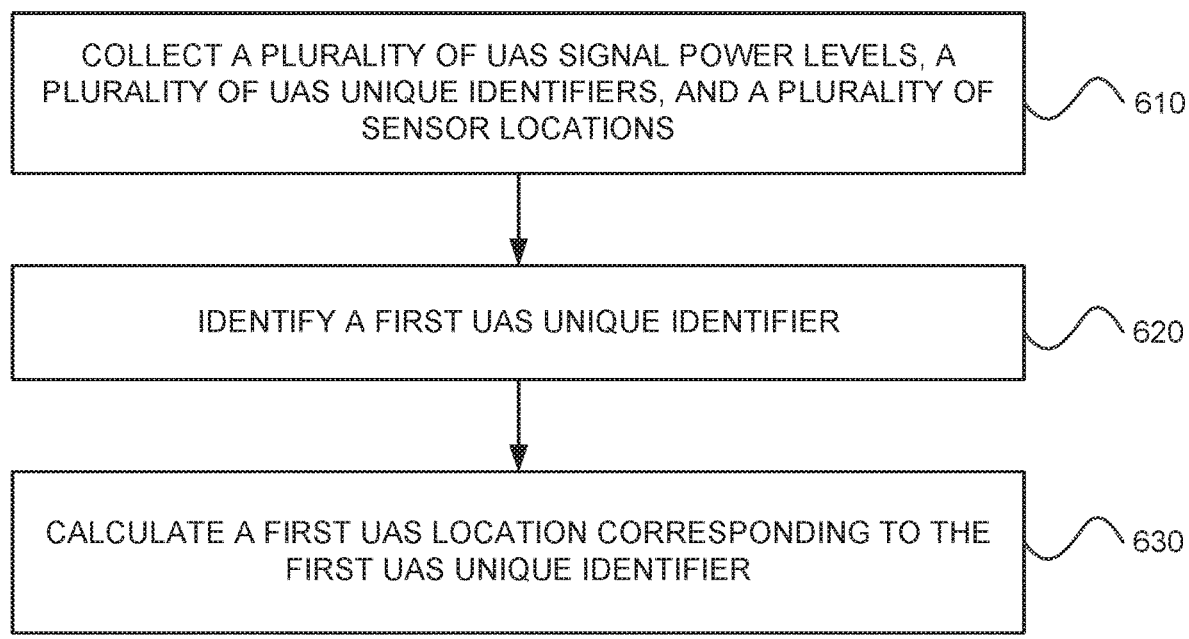

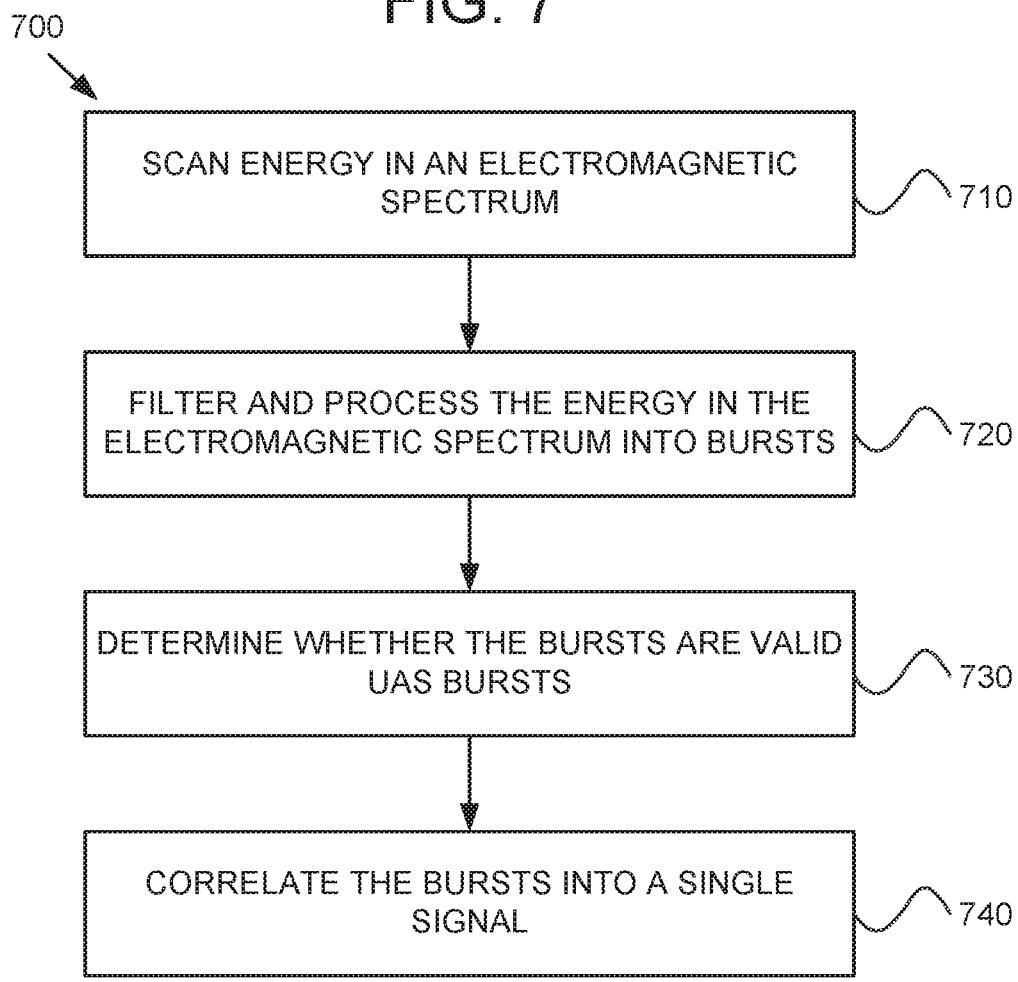

SYSTEM AND METHOD FOR MOBILE AND DISTRIBUTED CLOUD-CENTRIC DETECTION OF UNMANNED SYSTEMS

CROSS-REFERENCE TO RELATED APPLICATION

This application claims the benefit of U.S. Provisional Patent Application No. 62/669,621, filed on May 10, 2018, the entire contents of which are incorporated herein by reference.

BACKGROUND

The present disclosure relates generally to unmanned system detection and more particularly to a mobile sensor network for detecting, aggregating, and analyzing threats of unmanned systems.

Unmanned systems such as unmanned aerial systems ("UAS") are becoming increasingly more prevalent in fields such as imagery, surveying, construction, measurement, and a wide range of other applications. However, accompanying the wide range of great new capabilities enabled by these systems are a new set of potential threats to buildings, facilities, public gatherings such as sporting events or concerts, critical infrastructure, private corporations or individuals, and can even be used as auxiliary to crime. These risks can include negligent flight, surveillance, physical attack, or other forms of intervention which present a fundamentally new challenge to security and public safety. To counter these risks, a fundamentally new set of tools are needed to provide appropriate levels of security against this new class of threats.

BRIEF DESCRIPTION OF THE DRAWINGS

FIG. 5 is a flowchart of a process for detection by the sensor as shown in the system of FIG. 1, according to an exemplary embodiment.

FIG. 6 is a flowchart of a process of collecting data by the cloud aggregator as shown in the system of FIG. 1, according to an exemplary embodiment.

FIG. 7 is a flowchart of a process for detection by the sensor as shown in the system of FIG. 1, according to an exemplary embodiment.

DETAILED DESCRIPTION

Figure 1:
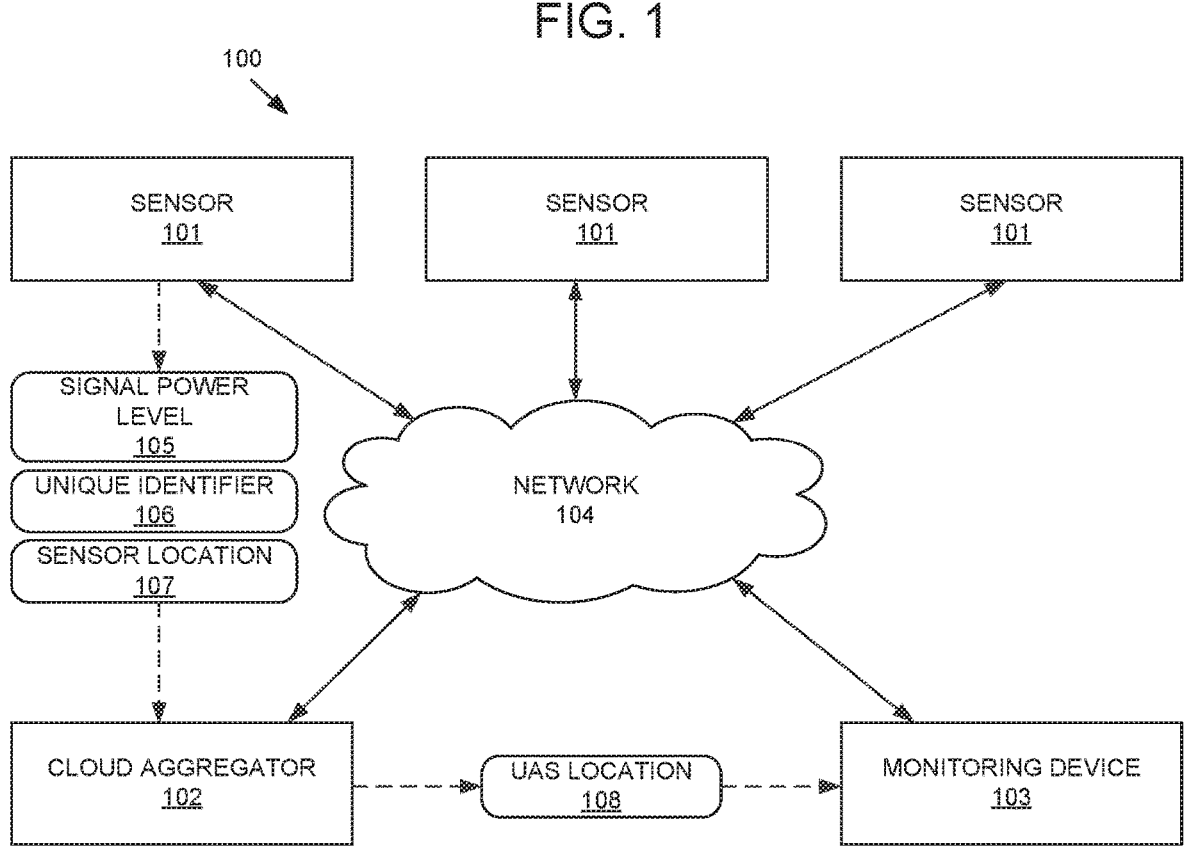
FIG. 1 is a block diagram of a UAS detection system, according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Systems that detect both manned and unmanned systems do currently exist in the market today. However, these systems tend to be overly complex and carry a high cost of purchase and operation. These sensors are not widely accessible or practical to security forces with restrictive budgets. A technical challenge for current systems is to detect unmanned vehicles in an urban environment. The sensors experience severe signal fading when buildings obstruct line-of-sight. Installing a sufficient number of legacy sensors can be cost prohibitive. Another technical challenge is that current systems lack broader situational awareness such as interconnectivity and are not operated as coherent and collaborative services. Finally, current systems lack technology featuring an intuitive interface for untrained operators.

Disclosed herein is a network of compact, fixed and mobile, low-cost sensing devices, a centralized aggregator for combining and analyzing the sensor data, and a system for monitoring devices for logging, monitoring, and alerting to operators about identified drones, which are also known as unmanned systems or unmanned aerial systems ("UAS"). Herein, unmanned system or UAS refers to both the unmanned vehicle as well as its associated remote control system including the pilot(s) and/or ground control station(s). The disclosure provides a technical solution for the technical challenge of detecting unmanned systems in various environments by providing a low-cost, scalable solution. For some situations such as in urban canyons, a sufficient number of sensors can be deployed, increasing the likelihood that a potential unmanned threat can be detected. In other situations, mobile sensors enable more flexible deployment scenarios (mobile security officers and benefits from mobile sensor triangulation) and procurement strategies (pooling resources across venues). The disclosure also offers a technical solution of interconnectivity and collaboration. The sensors identify UAS unique identifiers, which can be used by the aggregator to manage the aggregated data and by the monitoring devices to track threating UAS. Moreover, the sensors feature configurable software defined radios and each can be individually allocated to detect many different types of UAS, and can be remotely updated to detect new types of UAS even after sensor deployment. Finally, the disclosure provides a technical solution for interfacing to untrained operators. The system described offers intuitive user interface that maps the UAS, displays the power levels and/or estimated distances between sensors and UAS, and provides performance metrics and historical data.

FIG. 1 is a block diagram of a UAS detection system 100, according to an exemplary embodiment. The UAS detection system 100 is shown to include one or more sensors 101, a cloud aggregator 102, and one or more monitoring devices 103, all of which are coupled together by a network 104. Additional, fewer, or different blocks may be included depending on the implementation. Although the UAS detection system 100 embodiment targets UASs, it is understood that the UAS detection system 100 can target other unmanned systems such as the entire unmanned systems including the vehicle as well as its remote control system, and the like.

The sensor 101 may detect a UAS. In some embodiments, the sensor 101 scans an electromagnetic spectrum for signal activity. The scanning may be implemented using phased-array beam forming and beam steering techniques. The sensor 101 may filter and process the signal activity in the spectrum into bursts that are associated with UAS-related signals. The bursts may be extracted in time and frequency. Methods for extracting include extracting a time series at one or more frequencies of interest or extracting power at one or more time-intervals and at one or more frequencies of interest.

The sensor 101 may include a number of signal-specific paths. Each signal-specific path can determine whether a received signal is a UAS signal based on attributes of the signal such as signal power level 105, frequency and frequency pattern, burst length, modulation type, burst interval, and the like. The sensor 101 can generate a score for each of the attributes, for each of the sign-specific paths. Responsive to the score being greater than a predefined threshold, the sensor 101 can determine that the attribute of the received signal matches an attribute of a UAS signal. Responsive to determining a predefined number of matching attributes in one signal specific path, the sensor 101 can determine that the received signal matches a UAS signal. The sensor 101 may measure the UAS signal power level 105 in the signal-specific paths.

There may be collection of methods for different UAS types such as different UAS modulation types. The UAS modulation types include frequency shift keying (FSK), direct sequence spread spectrum (e.g. code division multiple access), orthogonal frequency division multiplexing ("OFDM"), frequency-hopping spread spectrum ("FHSS"), and the like. In some cases, the signal-specific paths are designated for different frequency bands. In some embodiments, a plurality of paths may be on one frequency band (e.g. both OFDM and FSK may produce energy in the 2.4 GHz band) or one path may cover multiple frequency bands (e.g. FSK produces energy in 2.4 GHz and 5.9 GHz bands). Each sensor 101 can be configured for many different UAS types. For example, a sensor 101 can detect UAS signals of OFDM modulation type at 2.4 GHz and UAS signals of FSK type at 5.9 GHz. In another example, a first sensor 101 can detect the UAS signals of OFDM modulation type at 2.4 GHz, and a second sensor 101 may detect the UAS signals of FSK type at 5.9 GHz. In another example, a first sensor 101 can receive a 2.4 GHz WiFi signal and a first UAS signal. The first sensor 101 can be specified to indicate that a signal is a UAS signal responsive to determining that the signal is at 2.4 GHz and of the OFDM modulation type. Upon processing the 2.4 GHz WiFi signal, the first sensor 101 can indicate that the 2.4 GHz WiFi signal is not a UAS signal responsive to determining that the 2.4 GHz WiFi signal is not of the OFDM type. Upon processing the first UAS signal, the first sensor 101 can indicate that the first UAS signal is a UAS signal responsive to determining that the first UAS signal is at 2.4 GHz and of the OFDM type.

The sensor 101 may correlate the bursts into an aggregate signal based on the known characteristics of that signal. Correlating the bursts into the aggregate signal can reduce false alarm rates and documents the patterns such as the frequency hopping pattern of many UAS-related signals. The sensor 101 may determine a UAS unique identifier 106 corresponding to the UAS in response to correlating the bursts into the aggregate signal. The UAS unique identifier 106 may be the frequency hopping pattern. Some manufacturers hard code the frequency hopping pattern of each individual radio differently so it is unlikely that two UASs will interfere with each other. The pattern may be referred to as a fingerprint. In some embodiments, the UAS unique identifier 106 is a hardware specific identification such as a media access control ("MAC") address in Wi-Fi networks, a network specific identification such as an Internet Protocol ("IP") address, or another unique address identifier.

The sensor 101 can measure its own sensor location 107 and may and may rely on a GPS hardware module. In some embodiments, the sensor 101 may determine a distance relative to the UAS and a direction of the UAS relative to the sensor 101. This may be achieved through a combination of power-based range estimations, known antenna patterns, and data fusion from multiple sensors within a collaborative network. In other embodiments, this is achieved through radar techniques and phased-array beam steering techniques. In some embodiments, the sensor 101 can capture an image of the UAS.

In some embodiments, the sensor 101 can send the UAS signal power level 105, the corresponding UAS unique identifier 106, and the sensor location 107 of the sensor 101 to the cloud aggregator 102 via the network 104. A data point may include a distance of the UAS relative to the sensor 101, a direction of the UAS relative to the sensor 101, an image of the UAS, an alert message, the UAS signal power level 105, the UAS unique identifier 106, and/or the sensor location 107. In some embodiments, the sensor 101 can send the data point asynchronously to the cloud aggregator 102. In other embodiments, the sensor 101 can send the data point synchronously to the cloud aggregator 102. The sensor 101 may send the data point to the cloud aggregator 102 via a local agent or a router.

The sensor 101 may be implemented as a man-portable RF sensing package designed to be easily carried by security personnel on patrol, on mobile operations, by festival or event operators and security, and the like. In other embodiments, the sensor 101 may be fixed. The sensor 101 may be mounted to a tripod, vehicle, building or other structural object. The sensor 101 may be associated with a client and a site. In some embodiments, the client is a person, a company, a downstream processing function, a law enforcement office, or the like. The sensor 101 may be assigned to multiple clients. The client may have full access to the sensor 101 or partial access to the sensor 101. The site may be a collection of sensors 101 within a geographic boundary or with some other common feature.

The cloud aggregator 102 may collect the data point from the sensor 101 via the network 104. The cloud aggregator 102 may collect a plurality of data points from a plurality of sensors 101 via the network 104. The cloud aggregator 102 can collect the data points in a way that avoids collision. Each of the data points may be encoded into a data signal. In some embodiments, each of the data signals of the respective sensor 101 may be associated with a unique code. The cloud aggregator 102 can decode each of the data signals by applying the respective code corresponding to the respective sensor 101. In some embodiments, the cloud aggregator 102 may assign time slots to each of the sensors 101 and each sensor 101 may send its data signal (e.g. its data point) during the respective timeslot. In some embodiments, the cloud aggregator 102 may assign a different frequency channel to each of the sensors 101 and each sensor 101 may send its data signal at the allocated frequency.

The cloud aggregator 102 can select a subset of data points which have the same UAS unique identifier 106. The cloud aggregator 102 may calculate a UAS location 108 based on the selected subset of data points having the same UAS unique identifier 106. In some embodiments, the cloud aggregator 102 may use trilateration or triangulation techniques to calculate the UAS location 108. Trilateration or triangulation techniques may include linear regression or non-linear regression. The cloud aggregator 102 may increase the accuracy of determining the UAS location 108 by collecting a higher number of data points corresponding to the UAS unique identifier 106 or by collecting data points from sensors 101 that are closer to the UAS that corresponds with the UAS unique identifier 106. The cloud aggregator 102 select a subset of the data points based on the corresponding power levels 105. The cloud aggregator 102 may select a first data point responsive to the power level 105 included in the data point being greater than a first predefined power threshold. The cloud aggregator 102 may discard a first data point responsive to the power level 105 included in the first data point being less than a second predefined power threshold. The cloud aggregator 102 may perform relation or triangulation using only the subset of the data points. In some embodiments, the cloud aggregator 102 may assign weights to the data points based on the corresponding power levels 105. The cloud aggregator 102 may assign a first weight responsive to the power level 105 included in the data point being greater than a first predefined power threshold. The cloud aggregator 102 may assign a second weight responsive to the power level 105 included in the first data point being less than a second predefined power threshold. The cloud aggregator 102 can compute a weighted trilateration or triangulation function (e.g. weighted least squares trilateration) using the weights. In the least squares approach, each data point may have a corresponding error, and the cloud aggregator 102 may compute a weighted error as a product of the error and the corresponding weight determined based on the power level 105.

The cloud aggregator 102 can determine additional UAS information based on the unique identifier 106. The additional UAS information could include UAS brand, size, weight, top speed, typical use or how likely they are in a certain area, and information to potentially help a security officer quickly learn to pilot the UAS if control of the UAS must be physically taken from the pilot. In some embodiments, the cloud aggregator 102 can access an internet search engine and search for the additional UAS information using inferred UAS information as keywords. In other embodiments, the search may use the unique identifier 106 as a keyword. In other embodiments, the cloud aggregator 102 may use feature recognition to extract the additional UAS information from the received image of the UAS.

The cloud aggregator 102 may authenticate the sensor 101 by its universal unique identifier ("UUID"), which is a unique alpha-numeric string. In some embodiments, the cloud aggregator 102 can authenticate the sensor 101 by the UUID of the client associated with the sensor 101. The cloud aggregator 102 may authenticate the sensor 101 by the UUID of the site associated with the sensor 101. The cloud aggregator 102 can send the UAS location 108 to the monitoring device 103. In some embodiments, the cloud aggregator 102 can send the additional UAS information to the monitoring device 103.

The monitoring device 103 can receive the UAS location 108 and the UAS the additional UAS information. The monitoring device 103 can monitor the detected UAS. The monitoring device 103 may have a user interface. The user interface is designed to be simple for untrained users to operate. The user interface is further described as a block in the sensor 101 in FIG. 2.

The monitoring device 103 can be implemented as a cellular phone, a tablet, a laptop, a desktop, and the like. In some embodiments, the monitoring device 103 may be implemented as an on premise monitoring center such as a security operations center (e.g. for a stadium, mall, office building, and the like). In other embodiments, the monitoring device 103 may be implemented as a remote operations center.

The network 104 may comprise a local area network ("LAN"), a wireless LAN ("WLAN"), or wide area network ("WAN"). The network 104 may comprise a heterogeneous collection of networking links including a on premise network infrastructure such as a local network and WANs such as long term evolution ("LTE"), LTE-Unlicensed ("LTE-U"), Global System for Mobile communications ("GSM") and low-power WAN ("LPWAN"). The topology of the network 104 can be fixed within a deployed area, or it can be changing due to the mobile nature of the sensors 101. The topology can be a hybrid of the fixed sensors 101 and the mobile sensors 101. Various ranges and detection coverage areas could apply depending on intended deployment scenario where some sensors 101 could be targeted at long ranges in some direction or omni-directional in all directions. The architecture of the network 104 may be implemented as a traditional hub-and-spoke architecture with the cloud aggregator 102 being the hub and each sensor 101 being a spoke.

Figure 2:
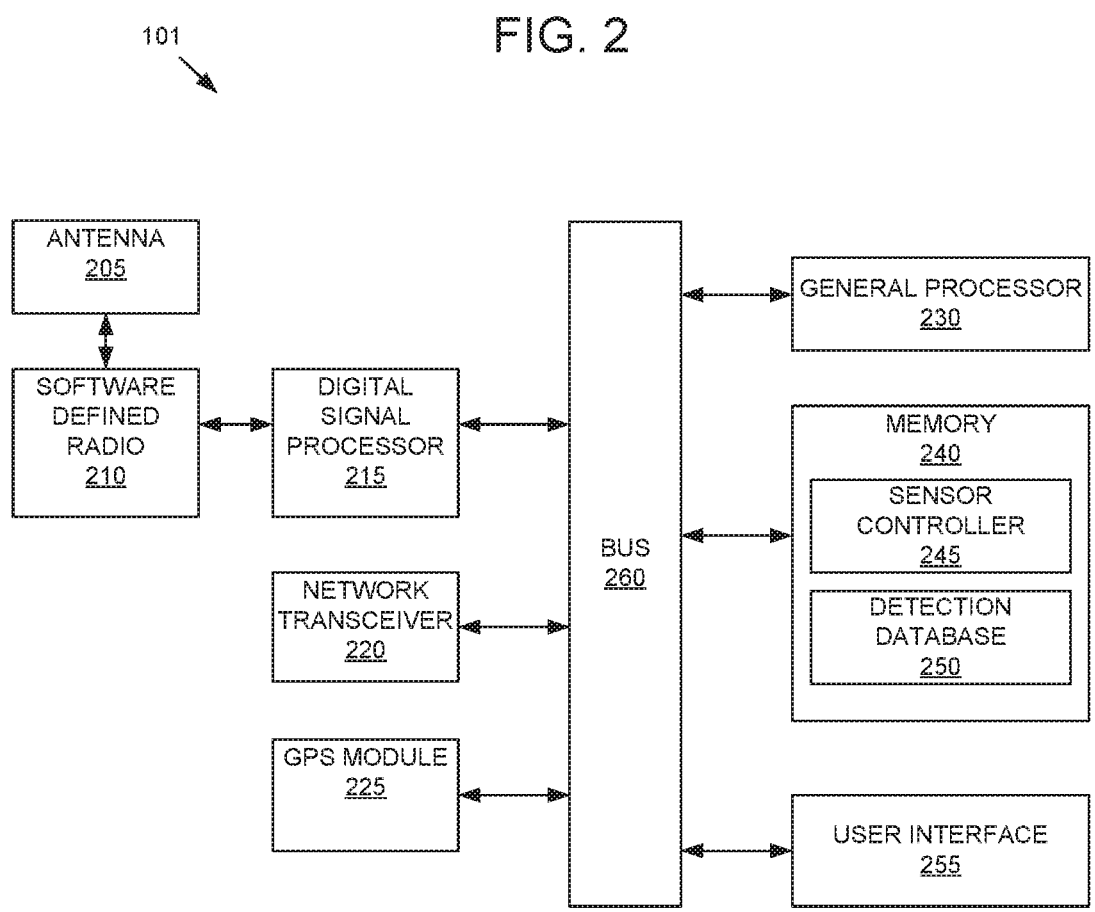
FIG. 2 is a block diagram of the sensor as shown in the system of FIG. 1, according to an exemplary embodiment.

FIG. 2 is a block diagram of the sensor 101 as shown in the system 100 of FIG. 1, according to an exemplary embodiment. The sensor is shown to include an antenna 205, a software defined radio ("SDR") 210, a digital signal processor ("DSP") 215, a network transceiver 220, a global positioning system ("GPS") module 225, a general processor 230, a memory 240, a user interface 255, and a bus 260. The bus 260 couples together the DSP 215, the network transceiver 220, the GPS module 225, the general processor 230, the memory 240 and the user interface 255. Additional, fewer, or different blocks may be included depending on the implementation.

The antenna 205 may receive the energy from the electromagnetic spectrum. The antenna 205 configuration may include directive antennas such as patch antennas, Yagi antennas, phased-array antennas, electronically steerable antennas, and the like. The antenna 205 may provide spatially focused sensing performance. For example, in a case of an airport deployment, the directional antennas 205 may point down a runway approach path.

The SDR 210 is a radio communication system coupled to the antenna 205. The SDR 210 can amplify, translate and filter the energy received by the antenna 205. The SDR 210 may have multiple paths that translate different frequency bands down to bands centered at 0 Hz or at a fixed offset from 0 Hz. Each path may include a passive or active mixer to translate the corresponding frequency band. Each mixer may be driven by a local oscillator. The SDR 210 may convert the energy from an analog domain into a digital domain. In some embodiments, the SDR 210 processes and correlates the energy. The SDR 210 may be re-configurable based on inputs from the DSP 215. One purpose of having the SDR 210 is that the cloud aggregator 102 or the sensor 101 may configure the SDR 210 to receive specific UAS signals communicating at specific frequency bands or using specific modulation types. Another purpose is for the cloud aggregator 102 or the sensor 101 to increase or decrease the range of the SDR 210. The SDR 210 may be implemented as an field-programmable gate array ("FPGA").

The DSP 215 is coupled to the SDR 210. The DSP 215 may filter and process the energy in the spectrum into bursts that are associated with UAS-related signals. In some embodiments, the DSP 215 can pass the bursts to a number of signal-specific paths which determine whether or not sufficient criteria are met such as signal power level 105, bandwidth, carrier frequency, frequency pattern, burst length, modulation type, burst interval, packet format, and the like. The DSP 215 can determine whether a criterion is met by generating a score and determining whether the score is greater than a threshold. The DSP 215 may compare the burst or the aggregation of bursts against a frequency domain mask to determine if the bandwidth matches a bandwidth of the UAS signal. The DSP 215 may compare the burst or the aggregation of bursts against a time-domain mask to determine if the burst length and the burst interval matches the burst length and the burst interval of the UAS signal.

The DSP 215 may demodulate the bursts into symbols. The symbols may have a real part and an imaginary part. The symbols may include ones and zeros. The DSP 215 can determine whether a modulation received signal matches a modulation of the UAS signal by comparing the symbol constellation of the received signal and the expected symbol constellation of the UAS signal. The DSP 215 may determine an error vector magnitude ("EVM"). If the EVM is below a predefined threshold, the received modulation type matches a UAS modulation type. If the EVM is above a predefined threshold, the received modulation type does not match a UAS modulation type.

The DSP 215 may correlate the bursts into an aggregate signal based on the known characteristics of that signal. The bursts may have unique timing or frequency channels. Correlation may be implemented using a rake-receiver. In some embodiments, the DSP 215 can determine a UAS unique identifier 106 corresponding to the UAS in response to correlating the bursts into the aggregate signal. The UAS unique identifier 106 may include a modulation pattern, frequency hopping pattern, or a hardware identifier such as a MAC address or other addressing identifier.

The network transceiver 220 may send the data point including the UAS signal power level 105, the unique identifier 106, and the sensor location 107 to the cloud aggregator 102. The data point may include at least one of the distance of the UAS relative to the sensor 101, the direction of the UAS relative to the sensor 101, the image of the UAS, and the alert messages. In some embodiments, the network transceiver 220 can send a request to cloud aggregator 102 to access the network 104. The network transceiver 220 may encode or append its UUID into the request to be sent. In some embodiments, the network transceiver 220 can send the UUID of the client associated with the sensor 101 or the UUID of the site associated with the sensor 101. The network transceiver 220 may use Wi-Fi, cellular LTE or other similar network connection. The network transceiver 220 may be implemented as an FPGA or as an application-specific integrated circuit ("ASIC").

The GPS module 225 may determine the sensor location 107 of the sensor 101. The GPS module 225 may be implemented as an ASIC. The general processor 230 can be configured store data, fetch data and execute applications, code and/or instructions stored in the memory 240. The general processor 230 may be implemented as an integrated circuit.

The memory 240 can store data, applications, code and/or instructions for execution by the processor 230. The memory 240 may include local memory such as cache, and secondary memory such as hard disk drive ("HDD"), solid-state drive ("SSD"), remote storage, cloud storage, and network storage. Both local memory and secondary memory can include random access memory ("RAM") and different types of read-only memory ("ROM").

The memory 240 is shown to include a sensor controller 245 and a detection database 250. The detection database 250 may store local recent-detection data to be sent to the cloud aggregator 102. The sensor controller 245 may control and update at least one of the antenna 205, the SDR 210, and the DSP 215. In some embodiments, the sensor controller 245 may send commands to the antenna 205 to beam-steer. In other embodiments, the sensor controller 245 may send commands to the SDR 210 to translate a different frequency band down to 0 Hz. In yet other embodiments, the sensor controller 245 may send commands to the DSP 215 to change the demodulating scheme, such as from quadrature amplitude modulation ("QAM") to OFDM. The sensor controller 245 may be implemented as instructions stored on the memory 240 and executed by the general processor 230 in order to perform operations specified by the sensor controller 245. In some embodiments, the sensor controller 245 is implemented as a computing device.

The user interface 255 may display a map in some graphical representation. The user interface 255 may display one or more UAS locations 108 as one or more circles or shapes reflecting actual antenna patterns with one or more diameters and one or more colors for coding. As the UAS location 108 becomes more accurate due to more sensors 101 detecting the UAS or because the sensors 101 are approaching the UAS, the diameter of the circle or range of the antenna pattern shape will adjust accordingly. In some embodiments, the user interface 255 can display an estimate of the distance between sensor and UAS, which may include signal strength, such as a signal power level 105, in decibels, of the UAS in relation to a location of the sensor 101 containing the user interface 255. The user interface 255 may display one or more sensor locations 107. In some embodiments, the user interface 255 can display the health of sensors 101. The user interface 255 may display detection metrics such as the signal power level 105, frequency of operation, modulation type, distance, the UAS location 108, location of pilot, alert level, and the like. The user interface 255 may receive user inputs to track or alert the user if a specified UAS is detected. In some embodiments, the user interface 255 can receive inputs to whitelist specific UASs.

In some embodiments, the user interface 255 may be implemented as an application or a set of instructions that is downloaded, stored onto the memory 240, and executed by the general processor 230 to perform operations of the user interface 255. In other embodiments, the user interface 255 may be implemented as a web-based user interface 255. In yet other embodiments, the user interface 255 can be implemented as a cloud-based Infrastructure-as-A-Service provider (e.g. Amazon AWS). In yet other embodiments, the user interface 255 is a stand-alone computing device that may be connected to the sensor 101. In some embodiments, the user interface may consist of a combination of lights and sounds which communicate simple operating conditions or alert conditions to the user without the need for a graphical user interface.

Each of the components of the sensor 101 (e.g. the SDR 210, the DSP 215, the network transceiver 220, the GPS module 225, the sensor controller 245, and the user interface 255) is implemented using hardware or a combination of hardware or software, in one or more embodiments. Each of the components can include circuitry such as CMOS transistors or BJT transistors. Each of the components can include any application, program, library, script, task, service, process or any type and form of executable instructions executing on hardware of the sensor 101. The hardware includes circuitry such as one or more processors (e.g. the general processor 230) in one or more embodiments. In some embodiments, one or more components (e.g. the DSP 215) has its own dedicated processor. Each of the one or more processors is hardware.

Figure 3:
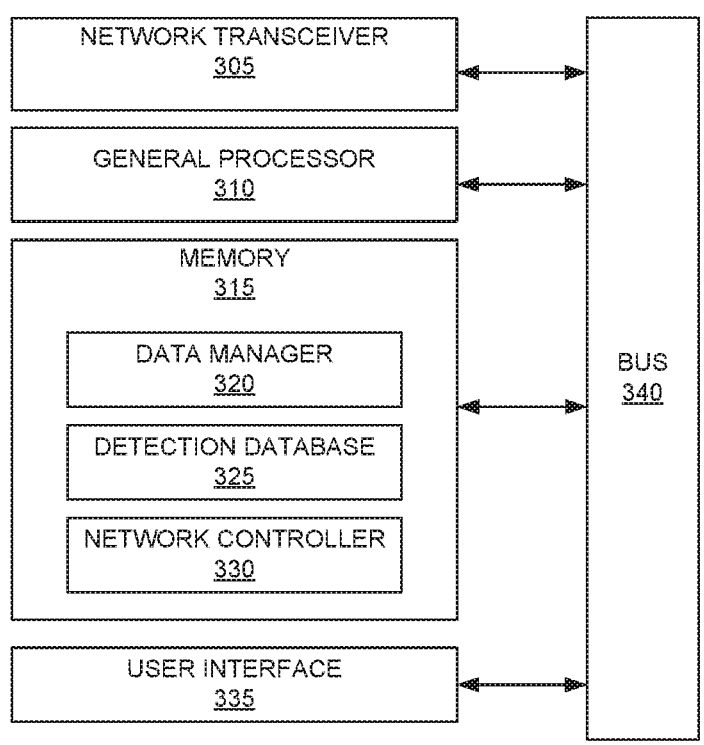
FIG. 3 is a block diagram of the cloud aggregator as shown in the system of FIG. 1, according to an exemplary embodiment.

FIG. 3 is a block diagram of the cloud aggregator 102 as shown in the system 100 of FIG. 1, according to an exemplary embodiment. The cloud aggregator 102 is shown to include a network transceiver 305, a general processor 310, a memory 315, a user interface 335, and a bus 340. The bus 340 couples together the network transceiver 305, the general processor 310, the memory 315, and the use interface 335. Additional, fewer, or different blocks may be included depending on the implementation.

The network transceiver 305 may receive the data point including the UAS signal power level 105, the unique identifier 106, and the sensor location 107 from the sensor 101. The data point may include at least one of the distance of the UAS relative to the sensor 101, the direction of the UAS relative to the sensor 101, the image of the UAS, and the alert messages from the sensor 101. The network transceiver 305 may receive a plurality of data points from a plurality of sensors 101. In some embodiments, the network transceiver 305 can receive a request from the sensor 101 to access the network 104. The network transceiver 220 may use Wi-Fi, cellular LTE or other similar network connection including proprietary hosted networks such as police radio networks. The network transceiver 305 may be implemented as an FPGA or as an ASIC.

The general processor 310 can be configured store data, fetch data and execute applications, code and/or instructions stored in the memory 315. The general processor 310 may be implemented as an integrated circuit.

The memory 315 can store data, applications, code and/or instructions for execution by the processor 310. The memory 315 may include local memory such as cache, and secondary memory such as hard disk drive ("HDD"), solid-state drive ("SSD"), remote storage, cloud storage, and network storage. Both local memory and secondary memory can include random access memory ("RAM") and different types of read-only memory ("ROM"). The memory 315 is shown to include a data manager 320, a detection database 325, and a network controller 330. The detection database 325 may store a plurality of data points received from the plurality of sensors 101. In some embodiments, the detection database 325 may include a lookup table ("LUT").

The data manager 320 organizes the plurality of data points into subsets so that each subset includes data points having the same UAS unique identifier 106. In some embodiments, each subset is assigned a different range of physical addresses in the detection database 325 of the memory 315. The UAS unique identifier 106 and the subset can be mapped in the LUT. For example, the UAS unique identifier 106 can be stored in an index in a first array of the LUT. The same index in the second array of the LUT can store the first address of the subset of the data points corresponding to the UAS unique identifier 106. In some embodiments, the data manager 320 calculates the UAS location 108 based on the subset of data points having the same UAS unique identifier 106. The calculation may be implemented by averaging the weighted sensor locations 107 of the data points corresponding to the UAS identifier 106. In some embodiments, each weight of each sensor location 107 is based on at least one of the UAS signal power level 105, the distances of the UAS relative to the sensor 101, and the direction of the UAS relative to the sensor 101. The data manager 320 may be implemented as instructions stored on the memory 315 and executed by the general processor 310 in order to perform operations specified by the data manager 320. In some embodiments, the data manager 320 is implemented as a computing device.

The network controller 330 may assign the sensors 101 to UAS types based on criteria such as modulation type or frequency range. In some embodiments, the network controller 330 can assign different sensors 101 to different UAS types. For example, the network controller 330 can assign a first sensor 101 to detect UAS signals of OFDM modulation type at 2.4 GHz, and a second sensor 101 to detect UAS signals of frequency hopping type at 5.9 GHz. The network controller 330 may decode the UUID of the sensor 101 and compare it to a list of permitted UUIDs with access types. The access types include administrative access, data sharing access, anonymized data access, and the like. If the network controller 330 finds a match between the UUID of the sensor 101 and one of the permitted UUIDs, the network controller 330 grants the access type associated with the permitted UUID that matches the UUID of the sensor 101. The network controller 330 may be implemented as instructions stored on the memory 315 and executed by the general processor 310 in order to perform operations specified by the network controller 330. In some embodiments, the network controller 330 is implemented as a computing device.

The user interface 335 may display a map in some graphical representation. The user interface 335 may display one or more UAS locations 108 as one or more circles or shapes reflecting antenna pattern with one or more diameters or sizes and with one or more colors. In some embodiments, the user interface 335 is the user interface 255 as shown in FIG. 2. In some embodiments, the user interface 335 may be implemented as an application or a set of instructions that is downloaded, stored onto the memory 315, and executed by the general processor 310 to perform operations of the user interface 335. In other embodiments, the user interface 335 may be implemented as a web-based user interface 335. In yet other embodiments, the user interface 335 can be implemented as a cloud-based Infrastructure-as-A-Service provider (e.g. Amazon AWS). In yet other embodiments, the user interface 335 is a stand-alone computing device that may be connected to the cloud aggregator 102.

Each of the components of the cloud aggregator 102 (e.g. the network transceiver, the data manager 320, the network controller 330, and the user interface 335) is implemented using hardware or a combination of hardware or software, in one or more embodiments. Each of the components can include circuitry such as CMOS transistors or BJT transistors. Each of the components can include any application, program, library, script, task, service, process or any type and form of executable instructions executing on hardware of the cloud aggregator 102. The hardware includes circuitry such as one or more processors (e.g. the general processor 310) in one or more embodiments. Each of the one or more processors is hardware.

Figure 4:
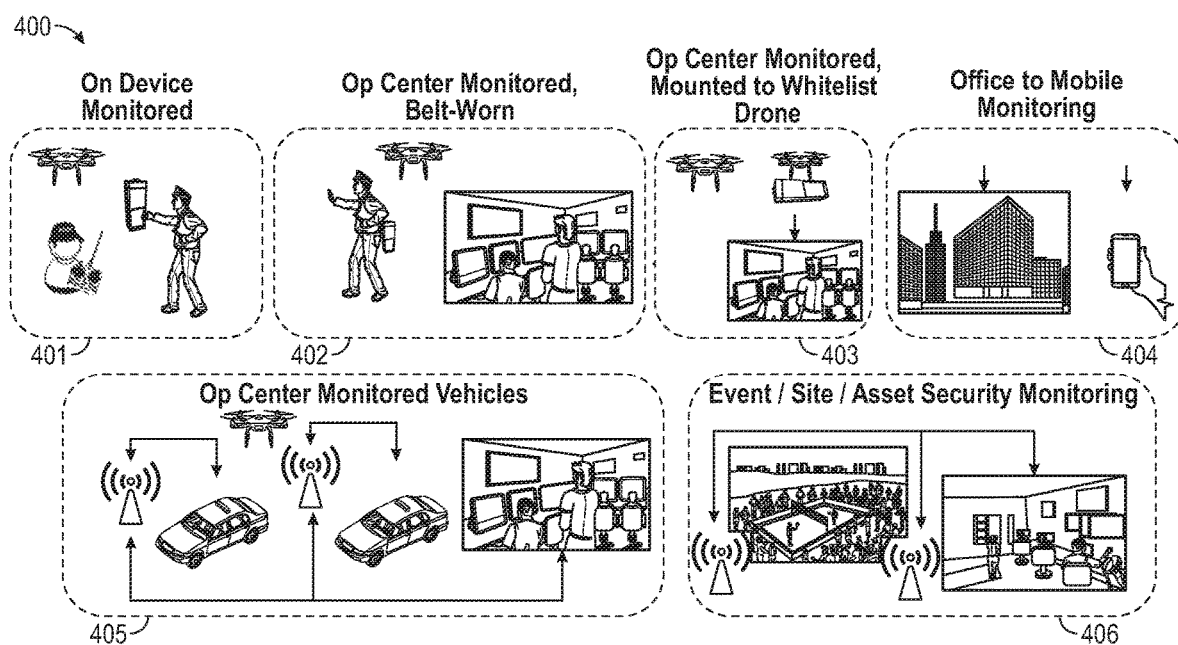
FIG. 4 is an illustration of use cases for the system as shown in the system of FIG. 1, according to an exemplary embodiment.

FIG. 4 is an illustration of use cases for the system 100 as shown in the system of FIG. 1, according to an exemplary embodiment. Deployment options may include handheld 401 sensors 101 and belt-worn 402 sensors 101. In some embodiments, the deployment options include sensors 101 mounted in a whitelisted UAS 403 and vehicle mounted 405 sensors 101. The deployment options may include sensors 101 affixed to an existing structure 404. The deployment options may include any combination of these. The sensor 101 may be operated manually, such as the handheld sensor, or may be managed by an automated local or central system, such as an asset security monitoring system at an event 406. UAS components detected may include the unmanned vehicle or its control system including pilot or ground station.

FIG. 5 is a flowchart of a process 500 for detection by a first sensor 101 like the sensor 101 as shown in the system 100 of FIG. 1, according to an exemplary embodiment. Additional, fewer, or different steps may be included depending on the implementation. At step 510, the first sensor 101 may detect a first UAS having a first signal power level 105. At step 520, the first sensor 101 can determine a first UAS unique identifier 106 corresponding to the first UAS. At step 530, the first sensor 101 can self-measure a first sensor location 107. At step 540, the first sensor 101 may send the first UAS signal power level 105, the corresponding first UAS unique identifier 106, and the first sensor location 107 to the cloud aggregator 102.

FIG. 6 is a flowchart of a process 600 of collecting data by the cloud aggregator 102 as shown in the system of FIG. 1, according to an exemplary embodiment. In some embodiments, the process 600 starts in response to the last step of the process 500. Additional, fewer, or different steps may be included depending on the implementation. At step 610, the cloud aggregator 102 can collect a plurality of UAS power levels 105, a plurality of UAS unique identifiers 106, and a plurality of sensor locations 107 from a plurality of sensors 101 including the first sensor 101. At step 620, the cloud aggregator 102 may select the first unique identifier 106 of the plurality of unique identifiers 106. At step 630, the cloud aggregator 102 may calculate a first UAS location 108 based on each of the plurality of UAS power levels 105 corresponding to the first unique identifier 106 and each of the plurality of sensor locations 107 corresponding to the first unique identifier 106. In some embodiments, the cloud aggregator 102 sends the first UAS location 108 to the monitoring device 103.

FIG. 7 is a flowchart of a process 700 for detection by the sensor 101 as shown in the system of FIG. 1, according to an exemplary embodiment. Additional, fewer, or different steps may be included depending on the implementation. At step 710, the sensor 101 can scan energy in an electromagnetic spectrum. At step 720, the sensor 101 may filter and process the energy in the electromagnetic spectrum into bursts. At step 730, the sensor 101 can determine whether the bursts are valid UAS bursts based on attributes. The sensor 101 can determine whether the bursts are the valid UAS bursts by determining whether the attributes of the bursts match the corresponding attributes of the UAS bursts. In some embodiments, the attributes include one or more of frequency, frequency pattern, burst length, modulation type, burst interval, and the like. At step 740, the sensor 101 may correlate the bursts into a single aggregate signal. The sensor 101 may correlate the bursts having attributes that match attributes of a common UAS burst type.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed:

1. A method comprising:
   scanning, by a sensor, energy generated in an electromagnetic spectrum by one or more unmanned aerial systems (UASs);
   processing, by the senor, the energy in the electromagnetic spectrum into bursts;
   determining, by the sensor, characteristics of the bursts, including frequency patterns of the bursts;
   comparing, by the sensor, the characteristics of the bursts with criteria associated with UAS bursts, wherein the criteria include frequency patterns associated with UAS bursts;
   determining, by the sensor, that the bursts are UAS bursts based on the characteristics of the bursts matching the criteria associated with UAS bursts; and correlating, the bursts into a single signal based on the matching criteria.

2. The method of claim 1, further comprising detecting a first UAS having a first UAS signal power level.

3. The method of claim 2, further comprising determining a first UAS unique identifier corresponding to the first UAS.

4. The method of claim 3, wherein the first UAS unique identifier is a media access control (MAC) address.

5. The method of claim 2, further comprising measuring a first sensor location.

6. The method of claim 1, wherein the scanning uses phased-array beam forming and beam steering.

7. The method of claim 1, further comprising passing, by the sensor, the bursts to a number of signal-specific paths to determine if a threshold is met.

8. An unmanned aerial system (UAS) detection device comprising:
a sensor having programmed instructions to cause the sensor to:
scan energy generated in an electromagnetic spectrum by one or more unmanned aerial systems (UASs);
process the energy in the electromagnetic spectrum into bursts;
determine, by the sensor, characteristics of the bursts, including frequency patterns of the bursts;
compare, by the sensor, the characteristics of the bursts with criteria associated with UAS bursts, wherein the criteria include frequency patterns associated with UAS bursts;
determine that the bursts are UAS bursts based on the characteristics of the bursts matching the criteria associated with UAS bursts; and
correlate the bursts into a single signal based on the matching criteria.

9. The device of claim 8, wherein the sensor further includes programmed instructions to cause the sensor to detect a UAS having a UAS signal power level.

10. The device of claim 8, wherein the sensor receives a sensor location from a GPS module.

11. The device of claim 8, wherein the sensor further includes programmed instructions to pass the bursts to a number of signal-specific paths to determine if a threshold is met.

12. A system comprising:
a cloud aggregator coupled to a network;
a first sensor coupled to the cloud aggregator via the network, wherein the first sensor includes programmed instructions to cause the sensor to:
detect a first unmanned aerial system (UAS) having a first UAS signal power level by comparing frequency patterns of the first UAS to known frequency patterns associated with UAS signals;
determine a first UAS unique identifier corresponding to the first UAS, wherein the first UAS unique identifier comprises a frequency-hopping pattern of the UAS;
measure a first sensor location; and
send the first UAS signal power level, the first UAS unique identifier, and the first sensor location to the cloud aggregator, wherein the cloud aggregator calculates a first UAS location based on at least the first sensor location as measured by the first sensor.

13. The system of claim 12, wherein the cloud aggregator calculates the first UAS location based on a plurality of UAS signal power levels corresponding to the first UAS unique identifier and a plurality of sensor locations corresponding to the first UAS unique identifier.

14. The system of claim 12, wherein the cloud aggregator collects the plurality of UAS signal power levels, a plurality of UAS unique identifiers, and the plurality of sensor locations from a plurality of sensors including the first sensor.

15. The system of claim 12, wherein the cloud aggregator selects the first UAS unique identifier.

16. The system of claim 12, wherein the first sensor includes programmed instructions to cause the first sensor to scan energy in an electromagnetic spectrum and process the energy in the electromagnetic spectrum into bursts.

17. The system of claim 16, wherein the first sensor further includes programmed instructions to determine whether the bursts are valid unmanned aerial system (UAS) bursts based on burst criteria.

18. The system of claim 17, wherein the first sensor further includes programmed instructions to correlate the bursts into a single signal.

19. The system of claim 18, wherein the first sensor further includes programmed instructions to pass the bursts to a number of signal-specific paths to determine if a threshold is met.

20. The method of claim 2, further comprising calculating, based on the first UAS signal power level, a location of the first UAS and displaying, on a graphical user interface (GUI), the location of the first UAS.

* * * * *